Jan. 12, 1954  H. G. SHAKESPEARE ET AL  2,665,856
SPINNING TYPE FISHING REEL
Filed Feb. 3, 1950  3 Sheets-Sheet 3
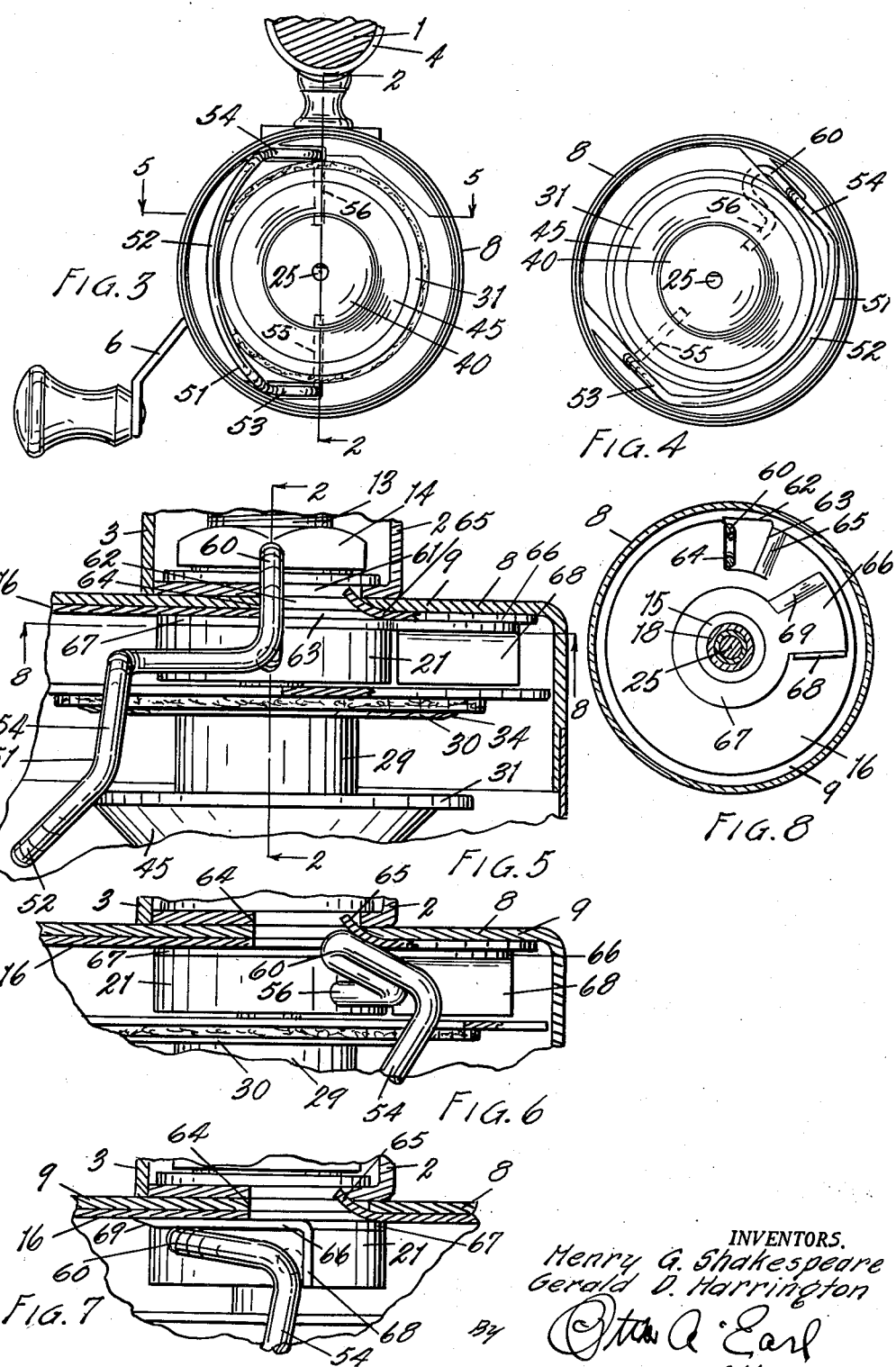
INVENTORS.
Henry G. Shakespeare
Gerald D. Harrington
By Otten A. Earl
Attorney.

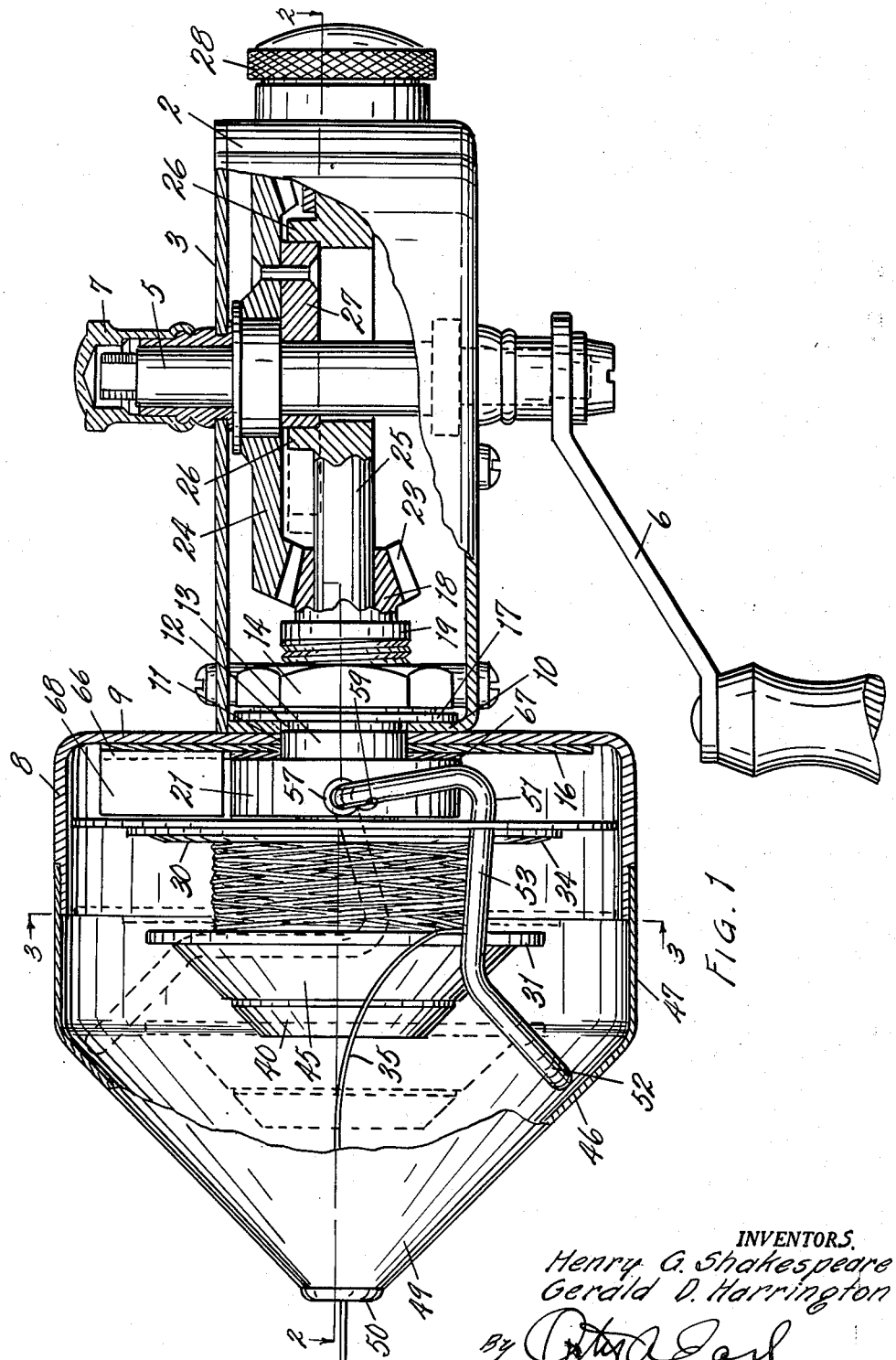

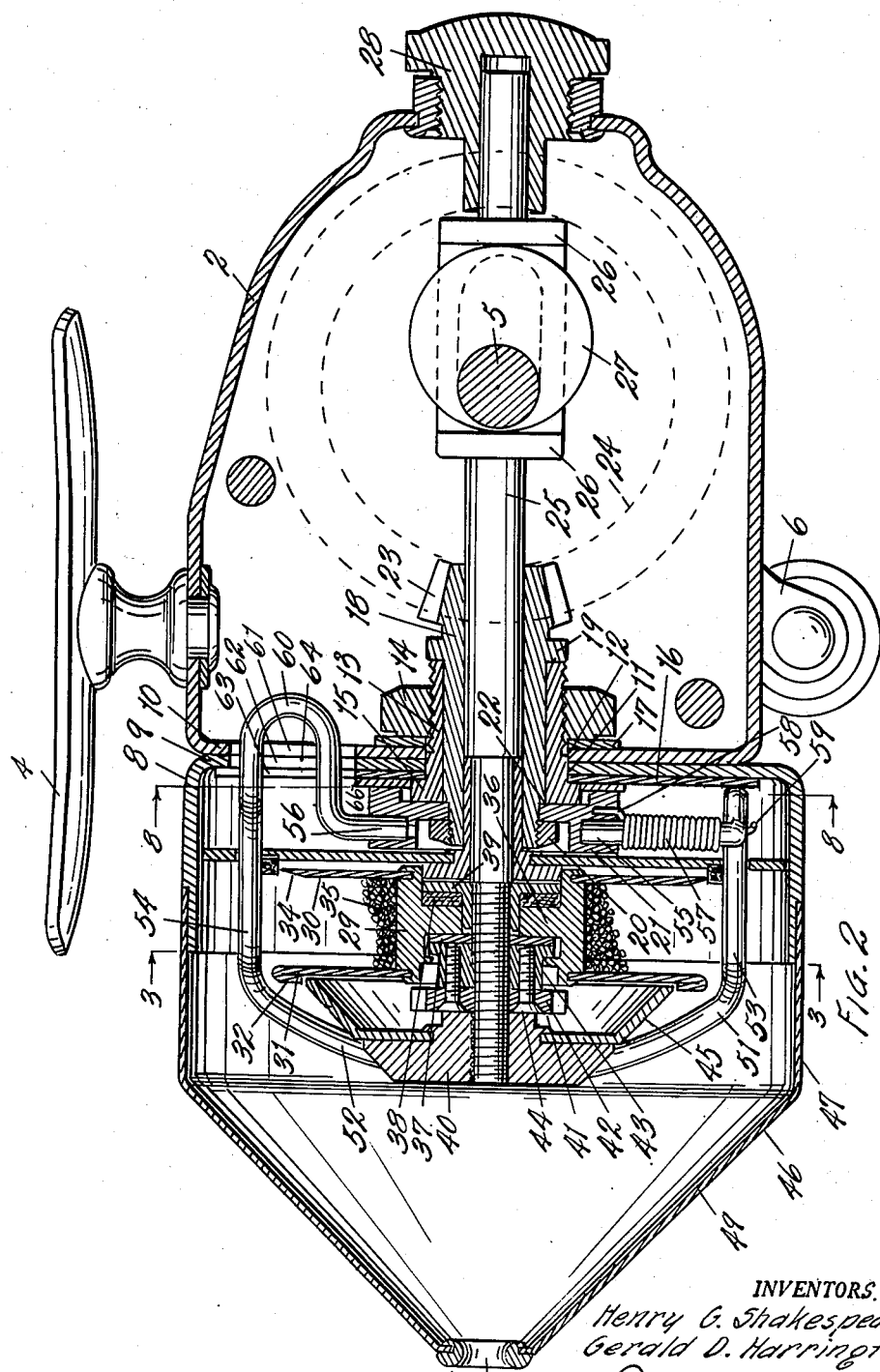

Patented Jan. 12, 1954

2,665,856

UNITED STATES PATENT OFFICE 2,665,856

SPINNING TYPE FISHING REEL

Henry G. Shakespeare and Gerald D. Harrington, Kalamazoo, Mich., assignors to Shakespeare Company, Kalamazoo, Mich.

Application February 3, 1950, Serial No. 142,143

18 Claims. (Cl. 242—84.4)

This invention relates to improvements in spinning type fishing reel.

The main objects of this invention are:

First, to provide a fishing reel of this type in which the line is automatically picked up on the line winding rotation of the pickup member and properly directed to the spool as the spool is axially reciprocated and at the same time when the line pickup or guide member is retracted from actuated position by a slight reverse rotation of the crank.

Second, to provide a spinning type level wind fishing reel in which the line is wound by rotating the pickup or guide line member about the spool and simultaneously axially reciprocating the spool.

Third, to provide a structure having these advantages which is simple and economical in its parts and the parts are readily assembled.

Objects relating to details and economies of the invention will appear from the description to follow. The invention is pointed out in the claims.

A preferred embodiment of the invention is illustrated in the accompanying drawings, in whch:

Fig. 1 is a fragmentary plan view of a fishing reel structure embodying our invention partially broken away and partially in longitudinal section, the parts being enlarged as compared to the commercial size.

Fig. 2 is a view mainly in vertical section on a line corresponding to the broken line 2—2 of Figs. 1, 3 and 5.

Fig. 3 is a fragmentary transverse section on a line corresponding to line 3—3 of Fig. 1 reduced in size and approximating commercial size.

Fig. 4 is a front elevational view with the front spool housing member removed, the crank and mounting clip not being illustrated.

Fig. 5 is an enlarged fragmentary view on a line corresponding to the broken line 5—5 of Fig. 3 and with the line pickup and guide member in retracted position.

Fig. 6 is a fragmentary sectional view of certain of the parts shown in Fig. 5 and illustrating the pickup member in partially actuated position.

Fig. 7 is a fragmentary sectional view illustrating the pickup member in fully actuated position.

Fig. 8 is a fragmentary view in section on line 8—8 of Figs. 2 and 5 illustrating the pickup keeper member and its relation to other parts, a portion of the pickup member illustrated being shown in pickup retracted position.

In the accompanying drawing a fishing rod is illustrated at 1. The embodiment of our invention illustrated comprises a gearbox 2 having a removable side plate 3. This gearbox is provided with a reel seat clip 4. In the accompanying drawing the reel illustrated is mounted on the underside of the rod 1 which is the preferred practice. The driving shaft 5 is disposed transversely of the gearbox and is provided with a manual actuating crank 6. In the structure illustrated the crank may be applied to either end of the shaft, the removable cap 7 being provided to protect the end of the shaft opposite that on which the crank is mounted.

The housing for the spool is in the embodiment illustrated formed separately from the gearbox and comprises the cylindrically walled rear housing member 8 provided with a back plate 9 which is disposed against the front wall 10 of the gearbox. The gearbox wall 10 and the housing back plate 9 have registering holes 11 and 12 through which the bearing member 13 is disposed, the bearing member being externally threaded to receive the clamping nut 14. The bearing member has an annular flange 15 at its front end which engages the wear plate 16 disposed on the front side of the back plate and having an opening therein receiving the bearing member. With this arrangement the gearbox and the housing are effectively but releasably secured together. A washer 17 is provided for the nut 14.

The tubular shaft 18 is arranged in the bearing and provided with a flange 19 at its rear end engaging the rear end of the bearing and with a nut 20 threaded upon its front end to clampingly secure the line pickup carrier 21 against the shoulder 22 on the shaft 18. The flange 19 and the carrier constitute end thrust members coacting with the ends of the bearing. The tubular shaft 18 is provided with a beveled gear 23 on its rear end desirably formed integrally therewith as is illustrated. The shaft 5 is provided with a gear 24 meshing with the gear 23. The spool spindle 25 is reciprocatingly mounted in the tubular bearing 18 and is provided with abutments 26 which coact with the eccentric 27 on the shaft 5 so that the spool spindle is reciprocated axially as the driven shaft 18 is rotated. The rear end of the spindle 25 is supported in a bearing 28 threaded into the rear end of the gearbox.

The spool in the embodiment illustrated comprises a barrel portion 29 having front and rear flanges 30 and 31 fixedly secured thereto. The periphery of the front flange is turned over at 32 to provide a rounded edge over which the line slides as it is pulled from and wound upon the spool and to constitute a guard member for a purpose to be pointed out. The rear flange desirably has a forwardly beveled peripheral portion 34. The line is indicated at 35. The spool is frictionally mounted on the spindle, the barrel of the spool being provided with an inwardly projecting friction member 36 with which the friction discs 37 and 38 coact. The disc 38 is supported by the thrust collar 39 on the spindle while the disc 37 is supported by the adjusting nut 40 threaded upon the spindle, the nut coacting with a thrust member designated generally by the numeral 41 and comprising the members 42 and 43 connected by the screws 44. The nut 40 is externally conical and carries a conical shield extension 45, the inner edge of which lies within the outturned edge 32 on the front spool and closely adjacent thereto so that the line cannot get between the spool and the nut.

The outer housing member 46 has a cylindrical portion 47 telescopingly engaging the inner housing member 8 and the conical portion 49 terminating in a central line guide eye 50.

The line pickup and guide member designated generally by the numeral 51 is carried by the carrier member 21 and is of general bail or U-shape. The bight portion 52 of the pickup member is outwardly offset relative to its arms 53 and 54 which are angled and terminate in journals 55 and 56 pivotally engaging opposed radial bearings provided therefor in the carrier member 21. A coil spring 57 is arranged on the journal 55 with its inner end 58 engaging the carrier member and its outer end 59 engaging the pickup member to bias it to retracted position. The arm 54 of the pickup member is conformed to provide a loop-like finger 60 which in one rotative position of the pickup member may enter into the registering openings 61, 62 and 63 in the front wall of the gearbox, the housing back plate and the wear plate, respectively. One edge of this opening constitutes a stop 64 for the finger when the pickup member is in retracted position as best shown in Fig. 5. The wear plate has a curved portion 65 at the opposite edge of the opening to be engaged by the finger and facilitates swinging of the pickup member to actuated position when the pickup carrier member is rotated in line winding direction.

To prevent the finger dropping into the opening described or partially dropping into it, we provide a keeper member 66 which has a supporting bearing portion 67 rotatable on the inner end of the tubular bearing member 12 and at the inner side of the carrier member. This keeper member has a forwardly projecting flange 68 which is engaged by the pickup member so that the keeper member is rotated with the pickup member when it is actuated in line winding direction. The forward edge 69 of the keeper member is beveled so that the pickup member slides onto the same and becomes positioned thereon as is shown in Fig. 7. The keeper member is segmental in form and is of such width as to cover the finger opening across the same, preventing the finger from entering the opening. On a reverse rotation of the pickup member, which results from a reverse rotation of the driving shaft through its crank, the pickup member slides off the keeper member and when its finger 60 becomes aligned with the opening it drops into the same under the stress of the spring 57 and engages the stop 64. In this position the pickup member clears the spool so that the line can be freely drawn therefrom over the front flange of the spool and without rotating the spool.

To retrieve or wind the line it is only necessary to rotate the driving shaft in line winding direction and the pickup member is automatically swung to pickup position and the line is guided upon the spool by the rotation of the pickup member around the spool. The axial reciprocation of the spool results in laying the line uniformly on the spool and with the wraps in crossed relation so that the wraps around the spool are very unlikely to become snagged or interlocked and the line freely and uniformly strips from the spool when a cast is made. The frictional connection for the spools of the spindle may be regulated according to the strength of the line, thereby minimizing breakage thereof.

We have illustrated and described our invention in what we consider to be a highly practical and desirable commercial embodiment thereof. We have not attempted to illustrate or describe other embodiments or adaptations as we believe the disclosure made will enable those skilled in the art to embody or adapt our invention as may be desired.

Having thus described our invention, what we claim as new and desire to secure by Letters Patent is:

1. In a fishing reel, the combination of a gearbox, a spool housing comprising a cylindrical forwardly facing rear member including a base plate disposed against said gearbox, a front housing member removably mounted on said rear housing member and having a conical front portion provided with a line guide eye at the apex thereof, a wear plate for said base plate disposed on the front side thereof, a bearing member disposed through the said wear plate, housing base plate and the adjacent wall of said gearbox and secured thereto, a tubular driven shaft disposed in said bearing member to project from the forward end thereof and provided with a gear within said gearbox, a driving shaft disposed transversely of said gearbox and provided with a gear coacting with a gear on said driven shaft, a spool spindle mounted for axial reciprocation within said driven shaft, said driving shaft having an eccentric and said spindle having followers coacting with said eccentric whereby the spindle is reciprocated as said driven shaft is rotated, a spool having front and rear flanges, the front flange having a rounded peripheral edge, the rear flange having a forwardly facing beveled peripheral edge, adjustable means for frictionally mounting said spool on said spindle, means for adjusting said friction spool, mounting means including a nut threaded upon the front end of said spindle and having a conical line guide surface, a line pickup carrier mounted within said housing on the forwardly projecting end of said driven shaft to rotate therewith, a generally U-shaped line pickup having angled arms terminating in radially and oppositely disposed journals pivoted on said carrier, a coiled spring on one of said journals having one end engaged with the carrier and the other with the adjacent arm of the pickup member to bias the pickup member to retracted position, the other arm of the pickup member having a rearwardly projecting loop adjacent its journal constituting an actuating finger, the adjacent wall of said gearbox, said housing base plate and said wear plate having registering openings therein through which said finger projects when said pickup member is in retracted line winding position, a keeper member rotatably mounted on said bearing at the front side of said wear plate to be engaged by and rotated with said pickup member when it is rotated in line winding direction for preventing its said finger entering said finger receiving openings, and a line guard plate rotatably mounted at the rear of the spool and provided with an annular spool flange guard member surrounding the rear flange of the spool, said guard plate being provided with openings through which the arms of said pickup member are disposed.

2. In a fishing reel, the combination of a gearbox, a spool housing comprising a cylindrical forwardly facing rear member including a base plate disposed against said gearbox, a front housing member removably mounted on said rear housing member and having a conical front portion provided with a line guide eye at the apex thereof, a bearing member disposed through the said housing base plate and the adjacent wall of said gearbox and secured thereto, a tubular driven shaft disposed in said bearing member to project from the forward end thereof and provided with a gear within said gearbox, a driving shaft disposed transversely of said gearbox and provided with a gear coacting with a gear on said driven shaft, a spool spindle mounted for axial reciprocation within said driven shaft, said driving shaft having an eccentric and said spindle having followers coacting with said eccentric whereby the spindle is reciprocated as said driven shaft is rotated, a spool having front and rear flanges, the front flange having a rounded peripheral edge, the rear flange having a forwardly facing beveled peripheral edge, adjustable means for frictionally mounting said spool on said spindle, means for adjusting said friction spool, mounting means including a nut threaded upon the front end of said spindle and having a conical line guide surface, a line pickup carrier mounted within said housing on the forwardly projecting end of said driven shaft to rotate therewith, a generally U-shaped line pickup having angled arms terminating in radially and oppositely disposed journals pivoted on said carrier, a coiled spring on one of said journals having one end engaged with the carrier and the other with the adjacent arm of the pickup member to bias the pickup member to retracted position, the other arm of the pickup member having a rearwardly projecting actuating finger, the adjacent wall of said gearbox and housing base plate having registering openings therein through which said finger projects when said pickup member is in retracted line winding position, a keeper member rotatably mounted on said bearing at the front side of said rear plate to be engaged by and rotated with said pickup member when it is rotated in line winding direction for preventing its said finger entering said finger receiving openings, and a line guard plate rotatably mounted at the rear of the spool and provided with an annular spool flange guard member surrounding the rear flange of the spool, said guard plate being provided with openings through which the arms of said pickup member are disposed.

3. In a fishing reel, the combination of a gearbox, a spool housing comprising a cylindrical forwardly facing rear member including a base plate disposed against said gearbox, a front housing member removably mounted on said rear housing member and having a conical front portion provided with a line guide eye at the apex thereof, a wear plate for said base plate disposed on the front side thereof, a bearing member disposed through the said wear plate, housing base plate and the adjacent wall of said gearbox and secured thereto, a tubular driven shaft disposed in said bearing member to project from the forward end thereof and provided with a gear within said gearbox, a driving shaft disposed transversely of said gearbox and provided with a gear coacting with a gear on said driven shaft, a spool spindle mounted for axial reciprocation within said driven shaft, said driving shaft having an eccentric and said spindle having followers coacting with said eccentric whereby the spindle is reciprocated as said driven shaft is rotated, a spool, adjustable means for frictionally mounting said spool on said spindle, a line pickup carrier mounted within said housing on the forwardly projecting end of said driven shaft to rotate therewith, a generally U-shaped line pickup having angled arms terminating in radially and oppositely disposed journals pivoted on said carrier, a coiled spring on one of said journals having one end engaged with the carrier and the other with the adjacent arm of the pickup member to bias the pickup member to retracted position, the other arm of the pickup member having a rearwardly projecting loop adjacent its journal constituting an actuating finger, the adjacent wall of said gearbox, said housing base plate and said wear plate having registering openings therein through which said finger projects when said pickup member is in retracted line winding position, and a keeper member rotatably mounted on said bearing at the front side of said wear plate to be engaged by and rotated with said pickup member when it is rotated in line winding direction for preventing its said finger entering said finger receiving openings.

4. In a fishing reel, the combination of a gearbox, a spool housing comprising a cylindrical forwardly facing rear member including a base plate disposed against said gearbox, a front housing member removably mounted on said rear housing member and having a conical front portion provided with a line guide eye at the apex thereof, a bearing member disposed through the said housing base plate and the adjacent wall of said gearbox and secured thereto, a tubular driven shaft disposed in said bearing member to project from the forward end thereof and provided with a gear within said gearbox, a driving shaft disposed transversely of said gearbox and provided with a gear coacting with a gear on said driven shaft, a spool spindle mounted for axial reciprocation within said driven shaft, said driving shaft having an eccentric and said spindle having followers coacting with said eccentric whereby the spindle is reciprocated as said driven shaft is rotated, a spool, adjustable means for frictionally mounting said spool on said spindle, a line pickup carrier mounted within said housing on the forwardly projecting end of said driven shaft to rotate therewith, a generally U-shaped line pickup having angled arms terminating in radially and oppositely disposed journals pivoted on said carrier, a coiled spring on one of said journals having one end engaged with the carrier and the other with the adjacent arm of the pickup member to bias the pickup member to retracted position, the other arm of the pickup member having a rearwardly projecting actuating finger, the adjacent wall of said gearbox and housing base plate having registering openings therein through which said finger projects when said pickup member is in retracted line winding position, and a keeper member rotatably mounted on said bearing at the front side of said wear plate to be engaged by and rotated with said pickup member when it is rotated in line winding direction for preventing its said finger entering said finger receiving openings.

5. In a spinning type fishing reel, the combination of a support provided with means for mounting on a fishing rod, a tubular driven shaft disposed with its axis longitudinally of the rod on which the reel is mounted, a spool spindle mounted for axial reciprocation within said driven shaft, a manually operated reversible driving shaft operatively connected to said driven shaft for rotating the same and to said spindle for reciprocating the same, a spool, adjustable means for frictionally mounting said spool on said spindle, means for variably adjusting said friction spool, mounting means including a nut threaded upon the front end of the spindle and having a conical line guide surface, a spool housing on said support having a conical front portion provided with a line guide eye at the apex thereof, a line pickup carrier mounted on said driven shaft to rotate therewith, a generally U-shaped line pickup member having angled arms terminating radially in oppositely disposed journals pivoted on said carrier, a coil spring on one of said journals having one end engaged with the carrier and the other with the adjacent arm of the pickup member to bias the pickup member to retracted position, the other arm of the pickup member having a rearwardly projecting actuating finger adjacent its journal, said support being provided with an opening into which said finger projects when the pickup member is in retracted line winding position, and a rotatably mounted keeper for said pickup member positioned to be engaged and rotated with the pickup member when it is rotated in line winding direction and preventing its said finger entering said opening, said pickup member being automatically disengaged from said keeper on the reverse rotation of the driving shaft.

6. In a spinning type fishing reel, the combination of a support provided with means for mounting on a fishing rod, a tubular driven shaft disposed with its axis longitudinally of the rod on which the reel is mounted, a spool spindle mounted for axial reciprocation within said driven shaft, a manually operated reversible driving shaft operatively connected to said driven shaft for rotating the same and to said spindle for reciprocating the same, a spool, means for frictionally mounting said spool on said spindle, a spool housing on said support, a line pickup carrier mounted on said driven shaft to rotate therewith, a generally U-shaped line pickup member having angled arms terminating radially in oppositely disposed journals pivoted on said carrier, a coil spring on one of said journals having one end engaged with the carrier and the other with the adjacent arm of the pickup member to bias the pickup member to retracted position, the other arm of the pickup member having a rearwardly projecting actuating finger adjacent its journal, said support being provided with an opening into which said finger projects when the pickup member is in retracted line winding position, and a rotatably mounted keeper for said pickup member positioned to be engaged and rotated with the pickup member when it is rotated in line winding direction and preventing its said finger entering said opening, said pickup member being automatically disengaged from said keeper on the reverse rotation of the driving shaft.

7. In a fishing reel, the combination of a gearbox and a spool housing provided with a line guide eye at its front end, a bearing member disposed longitudinally of the spool housing, a tubular driven shaft disposed in said bearing member to project into said spool housing, a manually actuated driving shaft, a spool spindle mounted for axial reciprocation within said driven shaft, said driving shaft having driving connections to said driven shaft and said spindle whereby the spindle is reciprocated as said driven shaft is rotated, a spool frictionally mounted on said spindle and having front and rear flanges, a line pickup carrier mounted on said driven shaft to rotate therewith, a generally U-shaped line pickup member having angled arms terminating in journals pivoted on said carrier, a coiled spring on one of said journals having one end engaged with the carrier and the other with the pickup member to bias the pickup member to retracted position, the other arm of the pickup member having a rearwardly projecting loop adjacent its journal constituting an actuating finger, a stop positioned to coact with said finger when the pickup member is in fully retracted position, a keeper member rotatably mounted on said bearing to be engaged by and rotated with said pickup member when it is rotated in line winding direction and retaining it in actuated position, and a line guard plate rotatably mounted at the rear of the spool and provided with an annular spool flange guard member surrounding the rear flange of the spool, said guard plate being provided with openings through which the arms of said pickup member are disposed.

8. In a fishing reel, the combination of a gearbox and a spool housing provided with a line guide eye at its front end, a bearing member disposed longitudinally of the spool housing, a tubular driven shaft disposed in said bearing member to project into said spool housing, a manually actuated driving shaft, a spool spindle mounted for axial reciprocation within said driven shaft, said driving shaft having driving connections to said driven shaft and said spindle whereby the spindle is reciprocated as said driven shaft is rotated, a spool frictionally mounted on said spindle, a line pickup carrier mounted on said driven shaft to rotate therewith, a generally U-shaped line pickup member having angled arms terminating in journals pivoted on said carrier, a coiled spring on one of said journals having one end engaged with the carrier and the other with the pickup member to bias the pickup member to retracted position, the other arm of the pickup member having a rearwardly projecting loop adjacent its journal constituting an actuating finger, a stop positioned to coact with said finger when the pickup member is in fully retracted position, and a keeper member rotatably mounted on said bearing to be engaged by and rotated with said pickup member when it is rotated in line winding direction and retaining it in actuated position.

9. In a fishing reel, the combination of a gearbox and a spool housing provided with a line guide eye at its front end, a bearing member disposed longitudinally of the spool housing, a tubular driven shaft disposed in said bearing member to project into said spool housing, a manually actuated driving shaft, a spool spindle mounted for axial reciprocation within said driven shaft, said driving shaft having driving connections to said driven shaft and said spindle whereby the spindle is reciprocated as said driven shaft is rotated, a spool on said spindle, a line pickup carrier mounted on said driven shaft to rotate therewith, a generally U-shaped line pickup member having arms pivoted on said carrier, a spring acting to bias the pickup member to retracted position, a stop positioned to coact with said pickup member when it is in fully retracted position, and a keeper member rotatably mounted on said bearing to be engaged by and rotated with said pickup member when it is rotated in line winding direction and retaining it in actuated position during such rotation.

10. In a fishing reel, the combination of a gearbox and a spool housing provided with a line guide eye at its front end, a bearing member disposed longitudinally of the spool housing, a tubular driven shaft disposed in said bearing member to project into said spool housing, a manually actuated driving shaft, a spool spindle mounted for axial reciprocation within said driven shaft, said driving shaft having driving connections to said driven shaft and said spindle whereby the spindle is reciprocated as said driven shaft is rotated, a spool on said spindle, a line pickup carrier disposed within said spool housing and mounted on said driven shaft to rotate therewith, a generally U-shaped line pickup member, the arms of which have radially inwardly projecting portions pivoted to the carrier rearwardly of the spool and radially inwardly of the periphery thereof, a spring coiled around one of the radially inwardly projecting portions and having its ends positioned relative to the carrier and the pickup member to bias the pickup member to retracted position, and a stop positioned to coact with said pickup member when it is in fully retracted position.

11. In a spinning type fishing reel, the combination of a support provided with means for mounting on a fishing rod, a tubular driven shaft disposed with its axis longitudinally of the rod on which the reel is mounted, a spool spindle mounted for axial reciprocation within said driven shaft, a manually operated reversible driving shaft operatively connected to said driven shaft for rotating the same and to said spindle for reciprocating the same, a spool, adjustable means for frictionally mounting said spool on said spindle, means for variably adjusting said friction spool, mounting means including a nut threaded upon the front end of the spindle and having a conical line guide surface, a reel housing on said support having a conical front portion provided with a line guide eye at the apex thereof, a line pickup carrier mounted on said driven shaft to rotate therewith, a generally U-shaped line pickup having its arms swingably mounted on said carrier, yieldable means acting to return the pickup member to retracted position, said support member being provided with a stop with which said pickup member coacts when it is in retracted position limiting the reverse rotation of the driving shaft, the bight of said pickup member when in retracted position clearing the spool to permit a line to run freely over the front flange thereof, and a rotatably mounted keeper for said pickup member positioned to be engaged thereby when rotated in line winding direction and to prevent said pickup member from engaging said stop during such rotation, the pickup member being automatically disengaged from said keeper on the reverse rotation of the shaft thereby permitting the pickup member to engage said stop.

12. In a spinning type fishing reel, the combination of a support provided with means for mounting on a fishing rod, a tubular driven shaft disposed with its axis longitudinally of the rod on which the reel is mounted, a spool spindle mounted for axial reciprocation within said driven shaft, a manually operated reversible driving shaft operatively connected to said driven shaft for rotating the same and to said spindle for reciprocating the same, a spool on said spindle, mounting means including a nut threaded upon the front end of the spindle and having a conical line guide surface, a reel housing on said support provided with a line guide eye, a line pickup carrier mounted on said driven shaft to rotate therewith, a generally U-shaped line pickup having its arms swingably mounted on said carrier, yieldable means acting to return the pickup member to retracted position, said support member being provided with a stop with which said pickup member coacts when it is in retracted position limiting the reverse rotation of the driving shaft, the bight of said pickup member when in retracted position clearing the spool to permit a line to run freely over the front flange thereof, and a rotatably mounted keeper for said pickup member positioned to be engaged thereby when rotated in line winding direction and to prevent said pickup member from engaging said stop during such rotation, the pickup member being automatically disengaged from said keeper on the reverse rotation of the shaft thereby permitting the pickup member to engage said stop.

13. In a spinning type fishing reel, the combination of a support, of a spindle mounted for axial reciprocation, a spool frictionally mounted on said spindle, means for adjusting the friction of such mounting, a line pickup carrier rotatably mounted at the rear of the spool, a manually operated shaft provided with a crank and operatively connected to said pickup carrier to rotate the same and operatively connected to said spool spindle to reciprocate the same axially and simultaneously with the rotation of said pickup carrier, a line pickup member swingably mounted on said carrier to overhang said spool and having an outwardly offset bowed line engaging portion at its front end, said pickup member being swingable on said carrier between retracted and line winding positions, and means for actuating said pickup member from retracted position to line winding position on the rotation of the pickup member carrier in line winding direction and retracting the same when the pickup member carrier is rotated in reverse direction, said last named means including yielding means for returning the pickup member to retracted position, and stop means for limiting such reverse rotation, said swingable mounting of said pickup member to said carrier being rearwardly of said spool and radially inwardly of the periphery of said spool.

14. In a spinning type fishing reel, the combination of a support, a spindle on said support, a spool on said spindle, a line pickup carrier rotatively mounted at the rear of the spool, a generally U-shaped line pickup member having the arms thereof terminating in radially and oppositely disposed portions terminating in journals pivoted on said carrier, one of said radially disposed portions having an integral rearwardly projecting loop-like portion, means on said support engageable with said rearwardly projecting loop-like portion to actuate said pickup member to line winding position on rotation of said pickup member in line winding direction, and means for retracting said pickup member upon reverse rotation thereof.

15. In a spinning type fishing reel, the combination of a support, a spindle on said support, a spool on said spindle, a line pickup carrier rotatively mounted at the rear of the spool, a generally U-shaped line pickup member having the arms thereof terminating in radially and oppositely disposed portions terminating in journals pivoted on said carrier rearwardly of the spool and radially inwardly of the periphery of the spool, one of said radially disposed portions having a rearwardly projecting portion, means on said support engageable with said rearwardly projecting portion to actuate said pickup member to line winding position on rotation of said pickup member in line winding direction, and means for retracting said pickup member from winding position upon reverse rotation thereof.

16. In a spinning type fishing reel, the combination of a support, of a spindle mounted for axial reciprocation, a spool on said spindle, a line pickup carrier rotatably mounted at the rear of the spool, a manually operated shaft provided with a crank and operatively connected to said pickup carrier to rotate the same and operatively connected to said spool spindle to reciprocate the same axially and simultaneously with the rotation of said pickup carrier, a line pickup member swingably mounted on said carrier to overhang said spool and having an offset bowed line engaging portion at its front end, said pickup member being swingable on said carrier between retracted and line winding positions, means for returning said pickup member from line winding position to retracted position, and means for actuating said pickup member from retracted position to line winding position on the rotation of the pickup carrier in line winding direction and retracting the same when the pickup carrier is rotated in reverse direction, said last named means including said return means, and stop means for limiting such reverse rotation, said pickup member having an integral rearwardly projecting loop-like portion engageable with said actuating means to actuate said pickup member to line winding position and engageable with said stop means for limiting said reverse rotation of the pickup carrier.

17. In a spinning type fishing reel, the combination of a support, of a spindle mounted for axial reciprocation, a spool frictionally mounted on said spindle, means for adjusting the friction of such mounting, a line pickup carrier rotatably mounted at the rear of the spool, and a manually operated shaft provided with a crank and operatively connected to said pickup carrier to rotate the same and operatively connected to said spool spindle to reciprocate the same axially and simultaneously with the rotation of said pickup carrier, a line pickup member swingably mounted on said carrier to overhang said spool, said pickup member being swingable on said carrier between retracted and winding positions, spring means for returning said pickup member from winding position to retracted position, means for actuating said pickup member from retracted position to line winding position on the rotation of the pickup member carrier in line winding direction and retracting the same when the pickup carrier is rotated in reverse direction, said last named means including said spring return means, and stop means for limiting such reverse rotation, said pickup member having an integral rearwardly projecting loop-like portion engageable with said actuating means to actuate said pickup member to line winding position and engageable with said stop means for limiting said reverse rotation of the pickup carrier.

18. In a spinning type fishing reel, the combination of a support, a spool mounted on said support, a line pickup carrier rotatably mounted at the rear of the spool, a manually operated shaft operatively connected to said pickup carrier to rotate the same, a line pickup member, means for swingably mounting said pickup member on said carrier in forwardly projecting overhanging relation to said spool, said pickup member being swingable on said carrier between retracted and line winding positions, means for automatically returning said pickup member from line winding position to retracted position when the pickup carrier is rotated in reverse direction, and means for positively actuating said pickup member from retracted position to line winding position on the rotation of the pickup member carrier in line winding direction, said means for swingably mounting the pickup member on the carrier including a portion of the pickup member projecting radially inwardly therefrom and pivotally connected to the carrier rearwardly of the spool and radially inwardly of the periphery thereof, said means for retracting the pickup member including a spring coiled around the radially inwardly projecting portion of the pickup member and having its ends operatively associated with the carrier and the pickup member.

HENRY G. SHAKESPEARE.
GERALD D. HARRINGTON.

References Cited in the file of this patent

UNITED STATES PATENTS

| Number | Name | Date |
|---|---|---|
| 1,187,840 | Illingworth | June 20, 1916 |
| 2,344,209 | Lowe | Mar. 14, 1944 |
| 2,498,987 | Duncan | Feb. 28, 1950 |
| 2,507,457 | Rix | May 9, 1950 |
| 2,521,543 | Shakespeare et al. | Sept. 5, 1950 |
| 2,546,465 | Martini | Mar. 27, 1951 |

FOREIGN PATENTS

| Number | Country | Date |
|---|---|---|
| 804,230 | France | July 27, 1936 |
| 195,577 | Switzerland | Feb. 15, 1938 |
| 598,412 | Great Britain | Feb. 18, 1948 |
| 249,540 | Switzerland | Apr. 16, 1948 |
| 950,630 | France | Mar. 28, 1949 |